US009147339B1

(12) United States Patent
Miasnik et al.

(10) Patent No.: US 9,147,339 B1
(45) Date of Patent: *Sep. 29, 2015

(54) MOBILE DEVICE FOR DISTRIBUTED NOTIFICATION TRANSMITTAL

(71) Applicant: Athoc, Inc., San Mateo, CA (US)

(72) Inventors: Guy Miasnik, Mountain View, CA (US); Aviv Siegel, San Mateo, CA (US)

(73) Assignee: AtHoc, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/198,441

(22) Filed: Mar. 5, 2014

Related U.S. Application Data

(63) Continuation of application No. 13/292,888, filed on Nov. 9, 2011, now Pat. No. 8,736,443.

(60) Provisional application No. 61/415,939, filed on Nov. 22, 2010.

(51) Int. Cl.
*G08B 21/00* (2006.01)
*G08B 27/00* (2006.01)
*G06F 17/30* (2006.01)

(52) U.S. Cl.
CPC .......... *G08B 27/00* (2013.01); *G06F 17/30864* (2013.01); *G08B 27/005* (2013.01); *G08B 27/006* (2013.01)

(58) Field of Classification Search
CPC ............... G06F 17/30286; G06F 17/30595; G06F 17/30864; E21F 17/18
USPC ............. 340/539.13, 540; 370/232, 252, 278; 455/404.1, 466; 707/999.002, 999.006, 707/999.1
See application file for complete search history.

(56) References Cited

U.S. PATENT DOCUMENTS

| 6,968,334 | B2 | 11/2005 | Salmenkaita et al. |
| 8,027,659 | B1 | 9/2011 | Daly et al. |
| 8,340,055 | B1 | 12/2012 | Oroskar et al. |
| 8,542,117 | B1 | 9/2013 | Miasnik et al. |
| 8,736,443 | B1 | 5/2014 | Miasnik et al. |
| 8,836,479 | B2 * | 9/2014 | Miasnik et al. ............. 340/7.61 |
| 2006/0117040 | A1 | 6/2006 | Begeja et al. |
| 2009/0233633 | A1 | 9/2009 | Morrison |
| 2010/0332522 | A1 | 12/2010 | Steidley |

OTHER PUBLICATIONS

Codespear, LLC, "SmartMsg for Pocket PC Version 2.0, Installation Guide," 2004, pp. 1-7, can be retrieved at <URL:http://www.codespear.com/Downloads/userdoc/51/PocketPC_InstallGuide.pdf>.

Federal Signal Corporation, "Federal Signal Codespear Product Solution Overview," Apr. 2007, pp. i, 1-10, can be retrieved at <URL:http://www.alertnotification.com/pdf/FS%20Public%20Safety%20-Codespear%20Overview%20FS07.pdf>.

(Continued)

*Primary Examiner* — John A Tweel, Jr.
(74) *Attorney, Agent, or Firm* — Fenwick & West LLP

(57) ABSTRACT

A system and a method are disclosed for delivering an alert from a mobile device. The method comprises using a mobile device to receive an alert initiation request, where the alert initiation request includes metadata of an alert to be delivered. The method extracts the metadata from the alert initiation request and persistently stores the extracted metadata in a first storage place. The method further securely transmits the alert initiation request and extracted metadata to one or more communication systems.

22 Claims, 12 Drawing Sheets

(56) References Cited

OTHER PUBLICATIONS

Federal Signal Corporation, "Data Sheet SmartMSG™, Federal Signal SmartMSF™ critical communications system," 2007, 2 pages, can be retrieved at <URL:http://www.federalwarningsystems.com/pdf/SmartMSG%20Data%20Sheet%2007.pdf>.

Federal Signal Corporation, "Did you know?" Jun. 2008, 10 pages, can be retrieved at <URL:http://www.federalwarningsystems.com/pdf/2008-06%20 DYK-FS%20SMARTMSG%20SUITES.pdf>.

Federal Signal Corporation, "First Responder Communication," 2008, 3 pages, [Archived on web.archive.org on Sep. 30, 2010] [online] [retrieved on Apr. 11, 2012] Retrieved from the internet <URL:http://web.archive.org/web/20100930104449/http://www.federalwarningsystems.com/products.php?prodid=42>.

Rave Mobile Safety, "RaveAlert, Overview," Webpage for Rave Mobile Safety, 2012, 1 page, [online] [retrieved on Apr. 11, 2012] Retrieved from the internet <URL:http://www.ravemobilesafety.com/campus/ravealert.html/overview>.

Rave Mobile Safety, "RaveGuardian, Overview," Webpage for Rave Mobile Safety, 2012, 1 page, [online][retrieved on Apr. 11, 2012] Retrieved from the internet <URL:http://www.ravemobilesafety.com/campus/guardian.html/overview>.

Waterfall Mobile, Inc., "ALERTU-Product" 2012, 1 page, [online] [retrieved on Apr. 11, 2012] Retrieved from the internet <URL:http://www.alertu.org/c/VisProductLogin>.

Office Action for U.S. Appl. No. 14/222,394, May 15, 2014, 6 Pages.

United States Office Action, U.S. Appl. No. 14/152,460, Sep. 5, 2014, 7 pages.

* cited by examiner

MOBILE DEVICE FOR DISTRIBUTED NOTIFICATION TRANSMITTAL

CROSS-REFERENCE TO RELATED APPLICATIONS

This application is a continuation of co-pending U.S. patent application Ser. No. 13/292,888, filed on Nov. 9, 2011, which claims priority under 35 U.S.C. §119(e) to U.S. Provisional Patent Application No. 61/415,939, filed on Nov. 22, 2010, entitled "MOBILE ALERTING SYSTEM USING DISTRIBUTED NOTIFICATION DELIVERY," all of which are hereby incorporated by reference in their entirety.

BACKGROUND

1. Field of Art

The disclosure generally relates to the field of emergency mass notification systems, more particularly, to a mobile alerting system using distributed mass notification delivery.

2. Description of the Related Art

Organizations face many threats which may affect their operation and the safety and security of their facilities and personnel. There is a growth of use of Emergency Mass Notification Systems (EMNS) by many organizations and on different levels, e.g., from a national, state, local to corporate and organization levels. Emergency Mass Notification systems allow authorized personnel to trigger alerts that are sent to large number of targeted recipients via a variety of communication methods, including electronic mail (email), short messaging system (SMS), voice phone alerts, computer screens, sirens, digital displays and others. EMNS can also provide detailed delivery and response tracking, and provide aggregated results via reports.

Conventional EMNS solutions are typically implemented in one of two ways: a Software as a Service (SaaS) EMNS system and an "on-premise" EMNS system. The SaaS system is hosted by a commercial hosting facility, which maintains all data repositories (users, contact details, alerting scenarios, etc.), and offers its functionality over the web, using data communication methods like voice phone alerts, email, SMS and others. An "on-premise" EMNS system is installed in a customer site, behind the firewall of the customer site and keeps all data local to the customer network. These systems are often connected to local delivery and communication systems (such as telephony exchange (PBX), email gateways, networked computers, etc.), offering communication capabilities (such as phone dialing, email delivery, desktop pop-ups on computers, etc) to targeted recipients.

When customer data is sensitive (for example, in government agencies and US Department of Defense), the customer usually chooses for the second solution architecture (i.e., "on-premise" EMNS system). The common conventional deployment architecture is an on-premise EMNS, residing on customer site or data center behind the customer firewall. However, a fully hosted system model is not acceptable in these cases because of data sensitivity or classification.

The conventional on-premise EMNS faces many challenges for efficiently delivering an alert to a large number of recipients via a variety of communication methods. For example, one challenge faced by the on-premise EMNS occurs when, due to major disasters that require evacuation of the facility or major local failures, the on-premise EMNS becomes not accessible or not available. Most common available solution is reverting to fully hosted alternatives, which (as described above) are not acceptable due to data sensitivity. There is no solution as of today to bridge this gap without compromising data sensitivity, or without reverting to use of limited local communication means (such as phone lines) in an alternate location. This limitation prevents a solution to provide large scale notification services based on sensitive information in emergency situation when a local failure or disaster occurs.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

Figure 1:
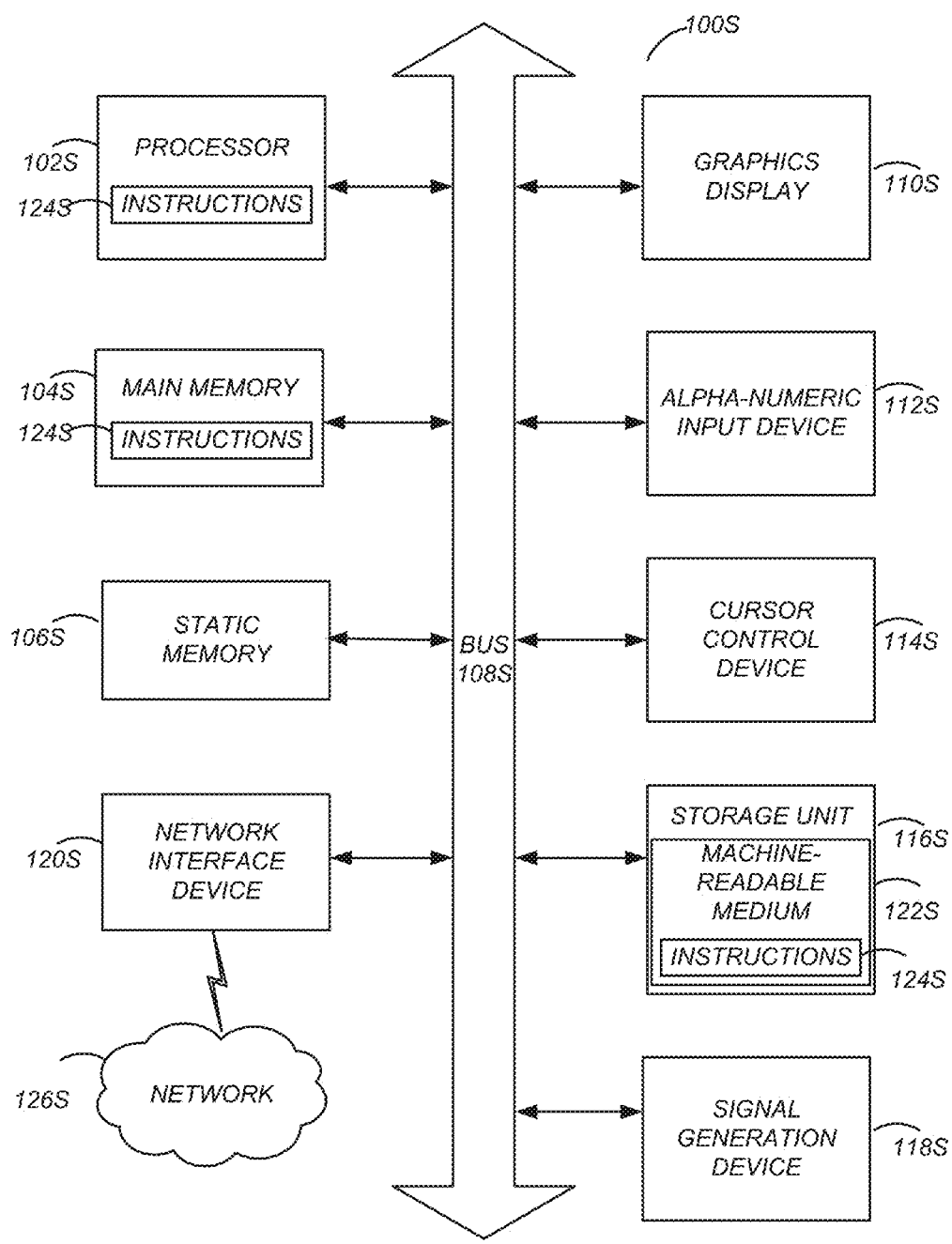
FIG. 1 illustrates one embodiment of components of an example machine able to read instructions from a machine-readable medium and execute them in a processor (or controller).

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

The above and other needs are met by a mobile alerting system using distributed notification delivery. In one example embodiment, the mobile alerting system stores securely all the sensitive information and executes an application to manage the mass notification process. The mobile alerting system uses a remote distributed alert delivery means in a separate highly redundant location, which can be connected to the mobile alerting system to deliver the alerts to the appropriate recipients via multiple delivery methods. The mobile alerting device can also synchronize with an on-premise alerting system to assure that all information needed for alerting (such as recipients' contact information, alerting flows) is stored on the mobile alerting device and available even if the on-premise system is not available.

Example embodiments of a disclosed method include receiving an alert initiation request from an alert operator, where the alert initiation request contains metadata of an alert to be delivered. The method extracts the metadata from the alert initiation request and its persistent storage place, where the extracted metadata includes at least one of alert content, alert parameters, recipients list, notification delivery device addresses, list of devices to be targeted and alert delivery scheduling information.

In one example embodiment, the method persistently stores the extracted metadata in a first storage place on the mobile alerting system, and makes an alert initiation request with one or more remote communication systems based on the extracted metadata of the alert initiation request. The remote communication system provides functions for delivering alerts. Responsive to an alert initiation request being authenticated, the method securely delivers the alert initiation request and extracted metadata of the alert initiation request to the remote communication system. The remote communication system stores the metadata transiently in a second storage place for the duration of delivering the alert within the remote communication system. The remote communication system is delivering the alert to the targeted recipients via their specified delivery devices as designated in the alert initiation metadata and is tracking delivery progress and collecting alert responses. The method further collects tracking data and alert responses associated with the alert delivered within the remote communication system, updates the metadata persistently stored in the first storage place based on the tracking data and alert responses.

Computing Machine Architecture

FIG. 1 is a block diagram illustrating components of an example machine able to read instructions from a machine-readable medium and execute them in a processor (or controller). Specifically, FIG. 1 shows a diagrammatic representation of a machine in the example form of a computer system 100S within which instructions 124S (e.g., software) for causing the machine to perform any one or more of the methodologies discussed herein may be executed. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a smartphone, a web appliance, a network router, switch or bridge, or any machine capable of executing instructions 124S (sequential or otherwise) that specify actions to be taken by that machine. Further, while only a single machine is illustrated, the term "machine" shall also be taken to include any collection of machines that individually or jointly execute instructions 124S to perform any one or more of the methodologies discussed herein.

The example computer system 100S includes a processor 102S (e.g., a central processing unit (CPU), a graphics processing unit (GPU), a digital signal processor (DSP), one or more application specific integrated circuits (ASICs), one or more radio-frequency integrated circuits (RFICs), or any combination of these), a main memory 104S and a static memory 106S, which are configured to communicate with each other via a bus 108S. The computer system 100 may further include graphics display unit 110S (e.g., a liquid crystal display (LCD), a projector, or a cathode ray tube (CRT)). The computer system 100 may also include alphanumeric input device 112S (e.g., a keyboard), a cursor control device 114S (e.g., a mouse, a trackball, a joystick, a motion sensor, or other pointing instrument), a storage unit 116S, a signal generation device 118S (e.g., a speaker), and a network interface device 120S, which also are configured to communicate via the bus 108S.

The storage unit 116S includes a machine-readable medium 122S on which is stored instructions 124S (e.g., software) embodying any one or more of the methodologies or functions described herein. The instructions 124S (e.g., software) may also reside, completely or at least partially, within the main memory 104S or within the processor 102S (e.g., within a processor's cache memory) during execution thereof by the computer system 100S, the main memory 104S and the processor 102S also constituting machine-readable media. The instructions 124S (e.g., software) may be transmitted or received over a network 126S via the network interface device 120S.

While machine-readable medium 122S is shown in an example embodiment to be a single medium, the term "machine-readable medium" should be taken to include a single medium or multiple media (e.g., a centralized or distributed database, or associated caches and servers) able to store instructions (e.g., instructions 122S). The term "machine-readable medium" shall also be taken to include any medium that is capable of storing instructions (e.g., instructions 122S) for execution by the machine and that cause the machine to perform any one or more of the methodologies disclosed herein. The term "machine-readable medium" includes, but not be limited to, data repositories in the form of solid-state memories, optical media, and magnetic media.

Mobile Alerting System Overview

Figure 2:
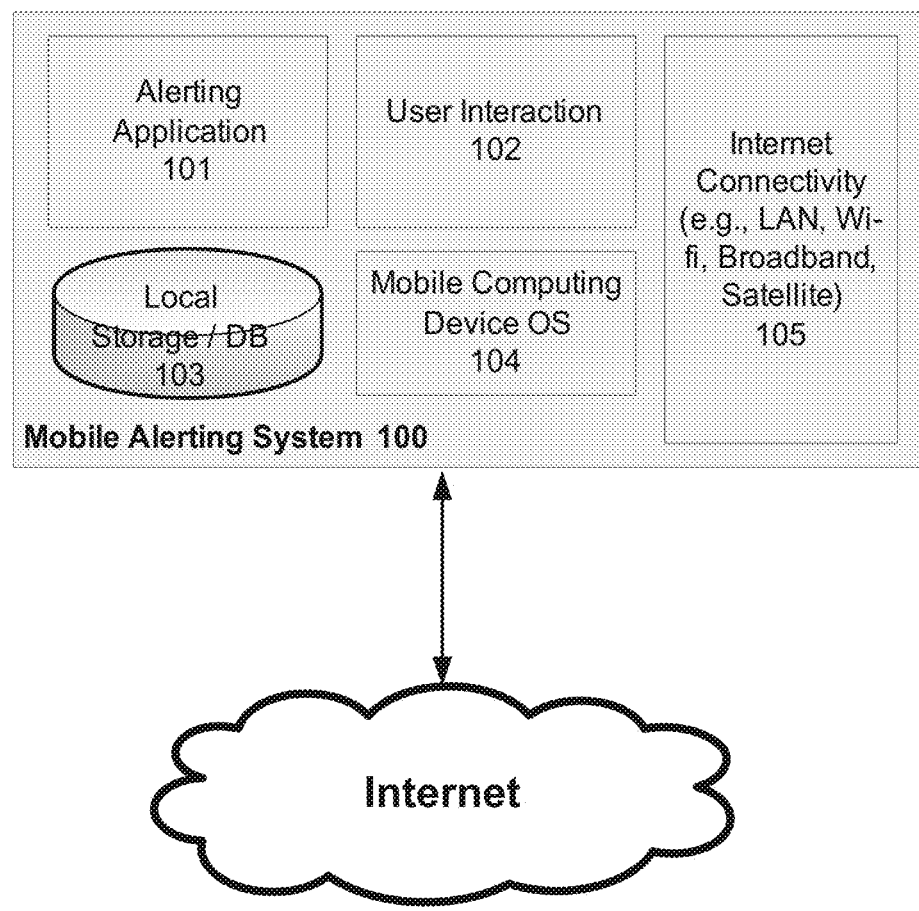
FIG. 2 illustrates a system architectural overview of a mobile alerting system (MAS) according to one embodiment.

FIG. 2 illustrates an example embodiment of a computer system having a Mobile Alerting System (MAS) 100 installed on a mobile platform. In the example embodiment illustrated in FIG. 2, the MAS 100 includes a user interaction module 102, an local storage or database (DB) 103, an mobile computing device operating system (OS) 104 and an alerting application 101 executed by the mobile computing device OS 104. The MAS 100 connects to other network entities via an Internet connectivity module 105.

In one embodiment, the mobile platform is a mobile computer such as a laptop or notebook, but possibly also be a smartphone or another mobile computing platform such as tablet device in other embodiments. The mobile computer can be ruggedized or semi-ruggedized. The Internet connectivity module 105 provides the MAS 100 a network connection via one or more Internet connection methods, e.g., via LAN, Wi-Fi, broadband or satellite phone connection. The MAS 100 executes the alerting application 101, with appropriate user interaction (UI) component 102, either as web based console, or as native client UI 102.

The MAS 100 stores all the data required for its operation, including all user repositories (user lists, contact details, distribution lists, etc.) in its local repository and database 103. Data sensitivity (e.g., Data At Rest (DAR) sensitivity) can be protected by using encrypted data storage to maintain all database data and prevent data leak in case of stolen or lost laptop or mobile computing device, in addition to implementing access control to the mobile computing OS 104. The data storage encryption may be accompanied by further securing the computing device operating system to comply with government regulations.

Distributed Notification Delivery Via Remote Communication Systems

Figure 3:
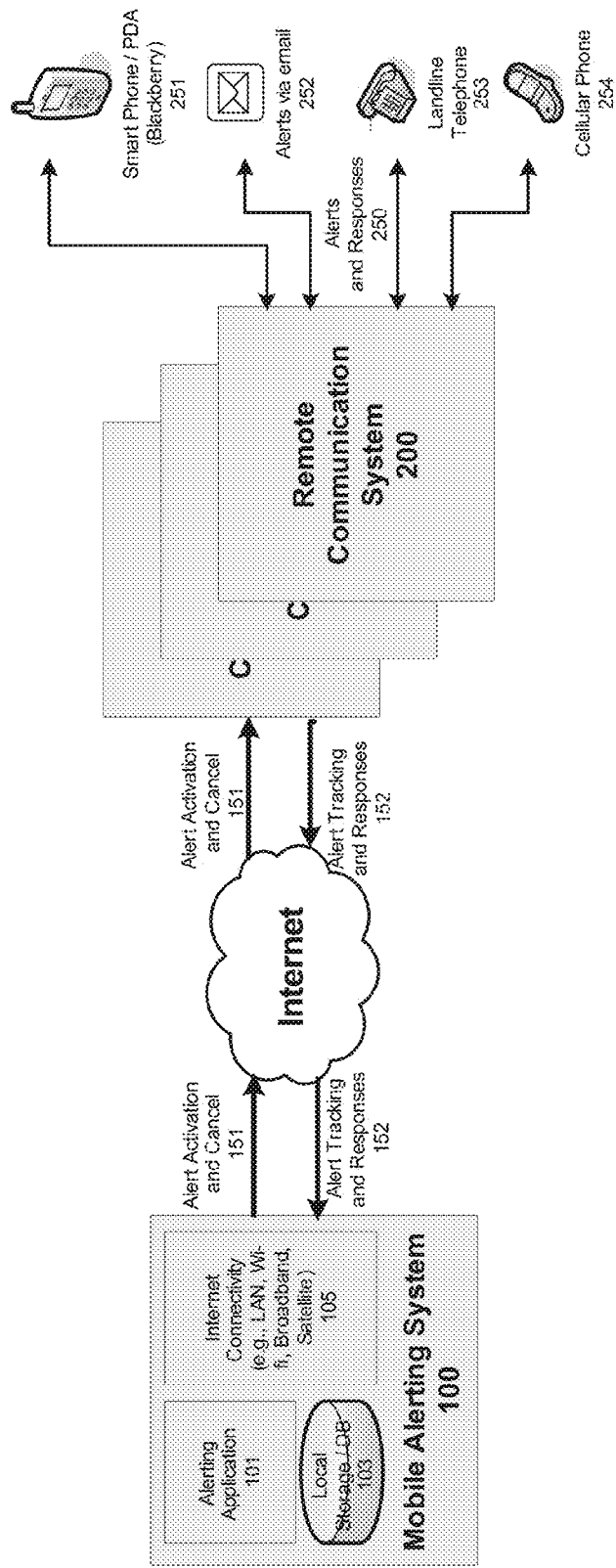
FIG. 3 is a flow diagram of distributing an alert via remote communication systems according to one embodiment.

FIG. 3 is a flow diagram of distributing an alert via remote communication systems 200 according to one embodiment. In the embodiment illustrated in FIG. 3, the MAS 100 executes the alerting application 101 and uses the Internet connectivity module 105 (e.g., via LAN, Wi-Fi, broadband or satellite phone) to securely distribute an alert via one or more remote communication systems 200. The remote communication systems 200 are also used by the MAS 100 to track delivery and responses 250 via their supported communication methods (e.g., via voice landline phone 253, voice cellular phone 254/251, email 252/251 and SMS (not shown in FIG. 3) via smart phone/PDA 251 or cellular phone 254, but possibly via other communication methods). The remote communication systems 200 may be implemented using highly available and secure computer systems, possibly redundantly deployed in multiple geographical locations, to ensure high availability. The MAS 100 is communicating the alert content, recipient list and other alert data, possibly with request to cancel live alerts 151, and is fetching alert distribution status and responses tracking 152 from the remote communication systems 200.

Figure 4:
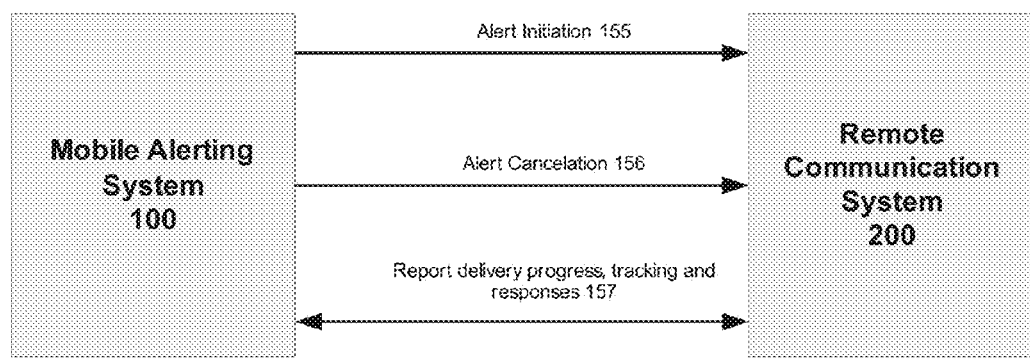
FIG. 4 illustrates one embodiment of a communication protocol between the MAS illustrated in FIG. 2 and a remote communication system.

FIG. 4 illustrates one embodiment of a communication protocol between the MAS 100 illustrated in FIG. 2 and a remote communication system 200. The communication protocol between the MAS 100 and the remote communication system 200 uses three types of requests: 1) initiate an alert transmission 155, by querying its local storage/database 103 and providing the alert content, scheduled time for delivery, a list of devices to be used, and a list of targeted recipients along with their required contact details; 2) cancel an alert transmission 156, for all recipients or to a subset of the recipients; and 3) report delivery progress for an alert or for a recipient 157, along with their responses (as applicable) to be stored in the local storage/database 103. Additional types of requests can be implemented as needed for the alert delivery functionality in other embodiments.

In one embodiment, the communication flow between the MAS 100 and the remote communication system 200 may be implemented as simple object access protocol (SOAP) web services, representational state transfer (REST) or extensible markup language (XML) payloads over hypertext text transfer protocol secure (HTTPS). The MAS 100 sends alert initiation 155 and alert cancellation 156 communication to the remote communication system 200. The reporting 157 can be periodically polled from an emergency mass notification system (EMNS) or be initiated from the remote communication system 200.

Figure 5:
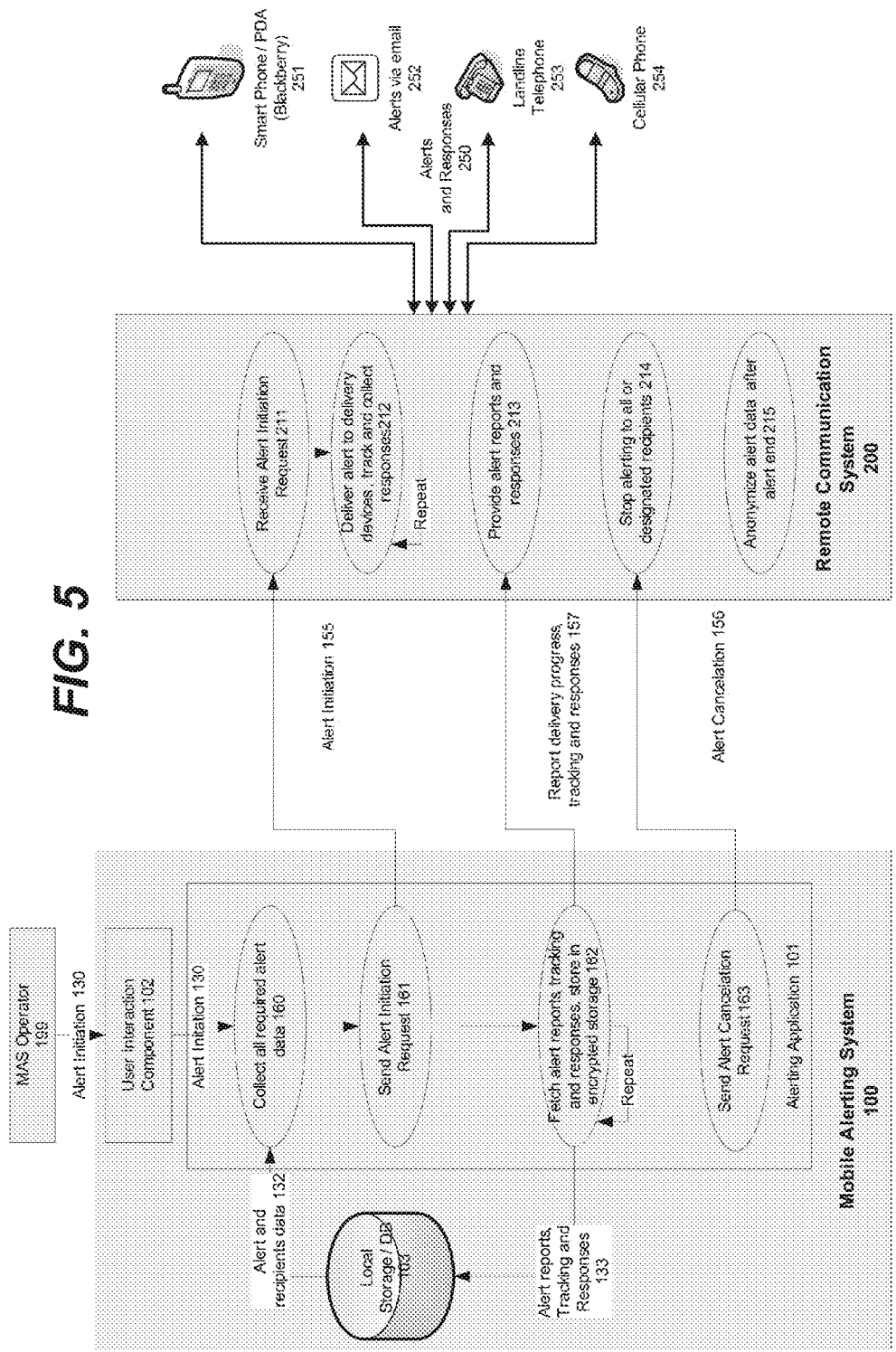
FIG. 5 is a flow diagram of delivering an alert from the MAS to a remote communication system according to one embodiment.

FIG. 5 is a flow diagram of delivering an alert from the MAS to a remote communication system according to one embodiment. The MAS 100 initiates an alert 130 via its operator 199 using the UI component 102 and executes the MAS alerting application 101 to collect all information required for the alert delivery 132 including the alert content, alert parameters, recipients list with their contact addresses, and scheduling information from its database in the local storage 103. The MAS 100 securely delivers an alert initiation request 155 to the remote communication system 200. In some cases, when there are redundant remote communication systems 200, and the primary remote communication system 200 is not accessible or operational, the MAS 100, via the alerting application 101, communicates with an alternate communication system. In other cases, the MAS 100, via the alerting application 101, connects with multiple remote communication systems 200 in parallel, each delivering alerts via different delivery devices. For example, one remote communication system 200 may deliver SMS and email alert messages, while another remote communication system 100 may be used to deliver phone voice alerts.

Once the remote communication system 200 accepts 211 an authenticated alert initiation 155, the remote communication system 200 starts delivering the alert (per allocated and available resources), while tracks 212 delivery status, user responses 250 and accounting and billing information. The reporting and tracking data (including alert responses) is periodically fetched by the MAS 100 or periodically delivered to the MAS 100 (e.g., steps 162, 157 and 213), to allow collection and storing of all alert response and tracking 133 data on the MAS local storage/database 103.

An alert may end or be canceled 163 (for all or for specific recipients) on the MAS 100. If the alert is canceled, an alert cancellation request 156 is initiated from the MAS 100 to the remote communication system 200. Upon accepting such authenticated cancellation request 214, the remote communication system 200 stops delivery of alert to all recipients or to designated recipients.

Figure 6:
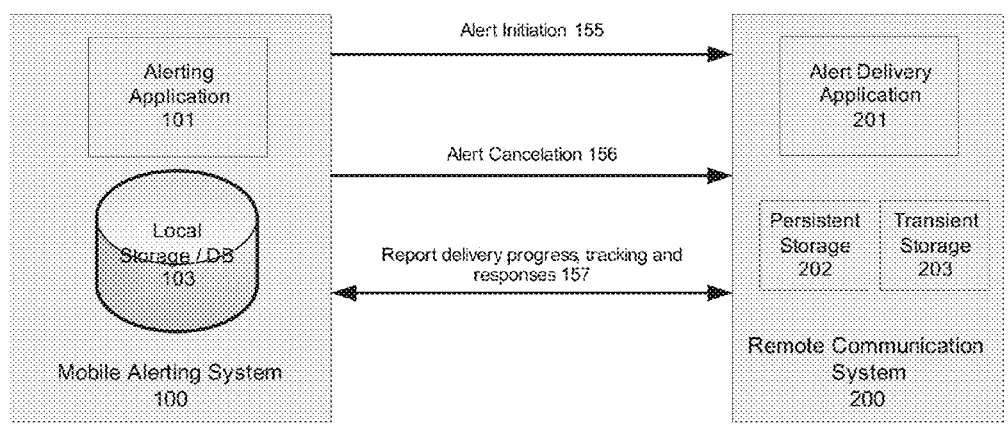
FIG. 6 is a flow diagram of receiving an alert at a remote communication system from the MAS illustrated in FIG. 2 according to one embodiment.

FIG. 6 is a flow diagram of receiving an alert at a remote communication system 200 from the MAS 100 illustrated in FIG. 2 according to one embodiment. As illustrated in FIG. 6, the remote communication system 200 includes a persistent storage 202, a transient storage 203 and an alert delivery application 201. The remote communication system 200 does not maintain user repository on a persistent basis, as all data required for the alert delivery (e.g., metadata extracted from an alert initiation request) is transmitted from the MAS 100 (where it is stored in the local storage/database 103) on demand, when there is a need to trigger alert delivery 155. The data required for the alert delivery include alert content, alert parameters, scheduling data, alert recipients and their contact details.

The remote communication system 200 executes the alert delivery application 201 to store the alert specific data (e.g., alert content, alert parameters, etc.) and the received alert responses, ongoing alert distribution status and aggregate billing data related to the alert delivery in the transient data repository 203. Additional non-alert specific configuration parameters or application specific data may be stored in the persistent storage 202 of the remote communication system 200 on a persistent basis.

After the alert delivery ends (or canceled for all recipients), the remote communication system 200 anonymizes the sensitive data (215 in FIG. 5), e.g., purge or scrap (mask) the sensitive data. Scrapping may be implemented by masking (updating) the sensitive data by non-descript characters (e.g. XXX@XXX.XXX for email addresses). Sensitive information, for example, may include the alert content, recipient name and their contact details (email addresses, phone numbers, etc.). The purging or scrapping of sensitive data shall not affect accounting or billing of delivery transactions through tracking accumulated and aggregate usage. This data will be stored in a persistent storage (e.g., persistent storage 202 in FIG. 6).

Figure 12:
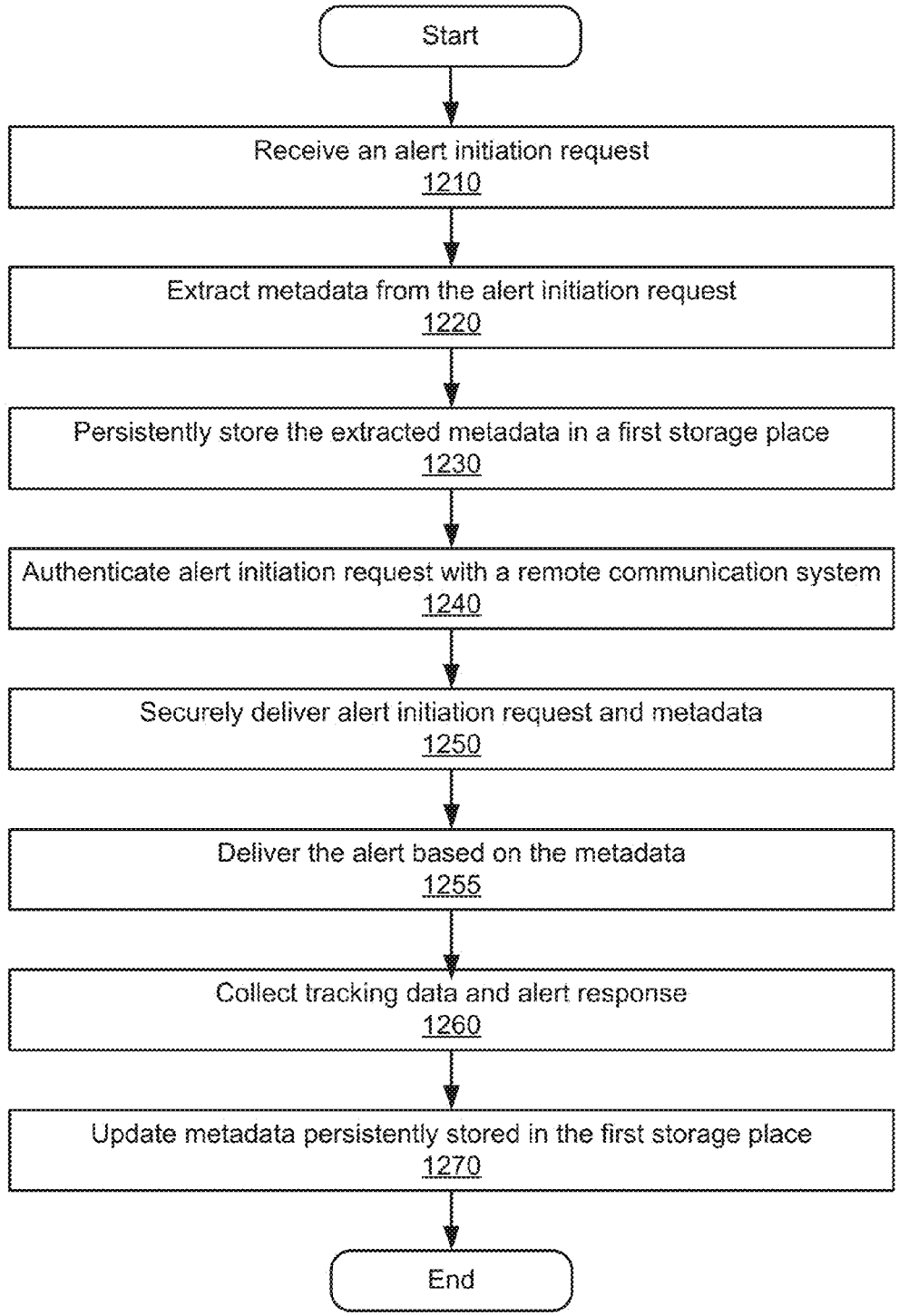
FIG. 12 is a flow chart of delivering an alert from the MAS to a remote communication system according to one embodiment.

To further illustrate the operation of the MAS 100 described above, FIG. 12 is a flow chart of delivering an alert from the MAS 100 to a remote communication system 200 according to one embodiment. Initially, the MAS 100 receives 1210 an alert initiation request from an alert operator, where the alert initiation request contains metadata of an alert to be delivered. The MAS 100 extracts 1220 the metadata from the alert initiation request. The extracted metadata include at least one of alert content, alert parameters, recipients list, notification delivery device addresses, list of devices to be targeted and alert delivery scheduling information. The MAS 100 persistently stores 1230 the extracted metadata in a first storage place (e.g., the local storage/DB 103), where sensitive data is not persistently stored. The MAS 100 authenticates 1240 the alert initiation request with a remote communication system 200 based on the extracted metadata of the alert initiation request. Responsive to the alert initiation request being authenticated, the MAS 100 securely delivers 1250 the alert initiation request and extracted metadata of the alert initiation request to the remote communication system 200. The remote communication system 200 stores the metadata transiently in a second storage place (e.g., the transient storage 203 of FIG. 6) for a duration of delivering the alert within the remote communication system 200. The remote communication system 200 delivers 1255 the alert based on the alert metadata. The MAS 100 further collects 1260 tracking data and responses associated with the alert delivered within the remote communication system 200 and updates 1270 the metadata persistently stored in the first storage place based on the tracking data and alert responses.

MAS Deployment Scenarios

MAS 100 can be deployed in two example scenarios: as a backup to a central on-premise EMNS 500 or as a stand-alone mobile alerting system. In the embodiment illustrated in FIG. 7, the MAS 100 is deployed as a backup to a central on-premise EMNS 500. In this deployment, all or a subset of the data of the central EMNS data repository 503 is replicated periodically or on-demand 550 from the EMNS data repository 503 to the MAS 100 to be stored in the local storage/database 103. The MAS 100 is ready to be used in an emergency situation as a backup EMNS, for example, during Emergency Operation Center evacuation or when central on-premise EMNS systems are not operational or not accessible.

Figure 8:
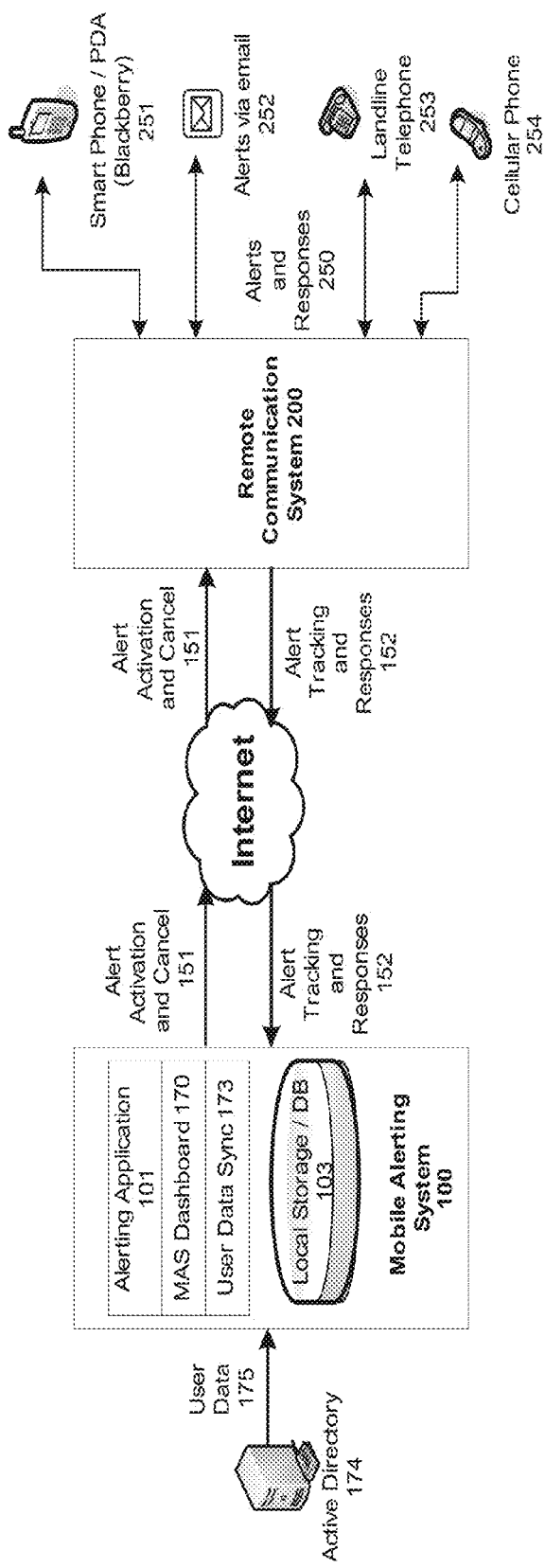
FIG. 8 illustrates an example deployment of the MAS as a stand-alone mobile alerting system according to one embodiment.

In another embodiment as illustrated in FIG. 8, the MAS 100 is deployed as a stand-alone mobile alerting system. In this case, the MAS 100 stores all operational data for all alerting function in its local storage/database 103, and is maintained by its operators and administrators. Integration with customer data repositories (such as Active Directory 174 and lightweight directory access protocol (LDAP)) may be implemented to synchronize user data 175 and maintain the most updated version of user data by a user data synchronization module 173.

In both example cases, the alerting functionality can be implemented by configuring the MAS 100 to securely use remote communication systems 200 for the actual delivery of alerts via their supported communication methods (such as voice phone calls, email, text messaging, etc, steps 250-254). The remote communication systems 200 purge or anonymize all alert sensitive data after alert delivery ends to protect data sensitivity.

Figure 9:
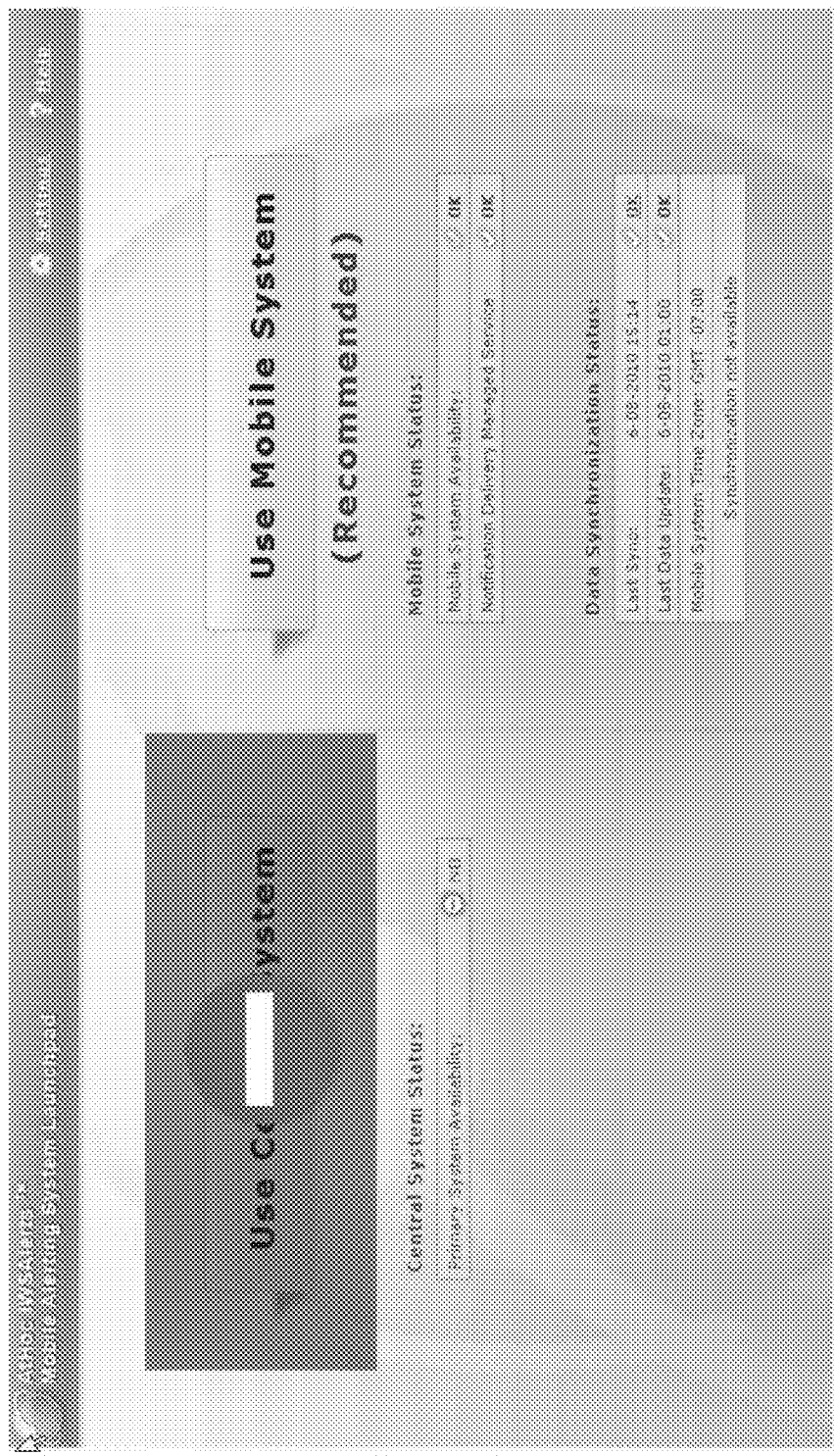
FIG. 9 is an example of a MAS dashboard for the example deployment of the MAS as a backup to a central on-premise emergency mass notification system according to one embodiment.
Figure 10:
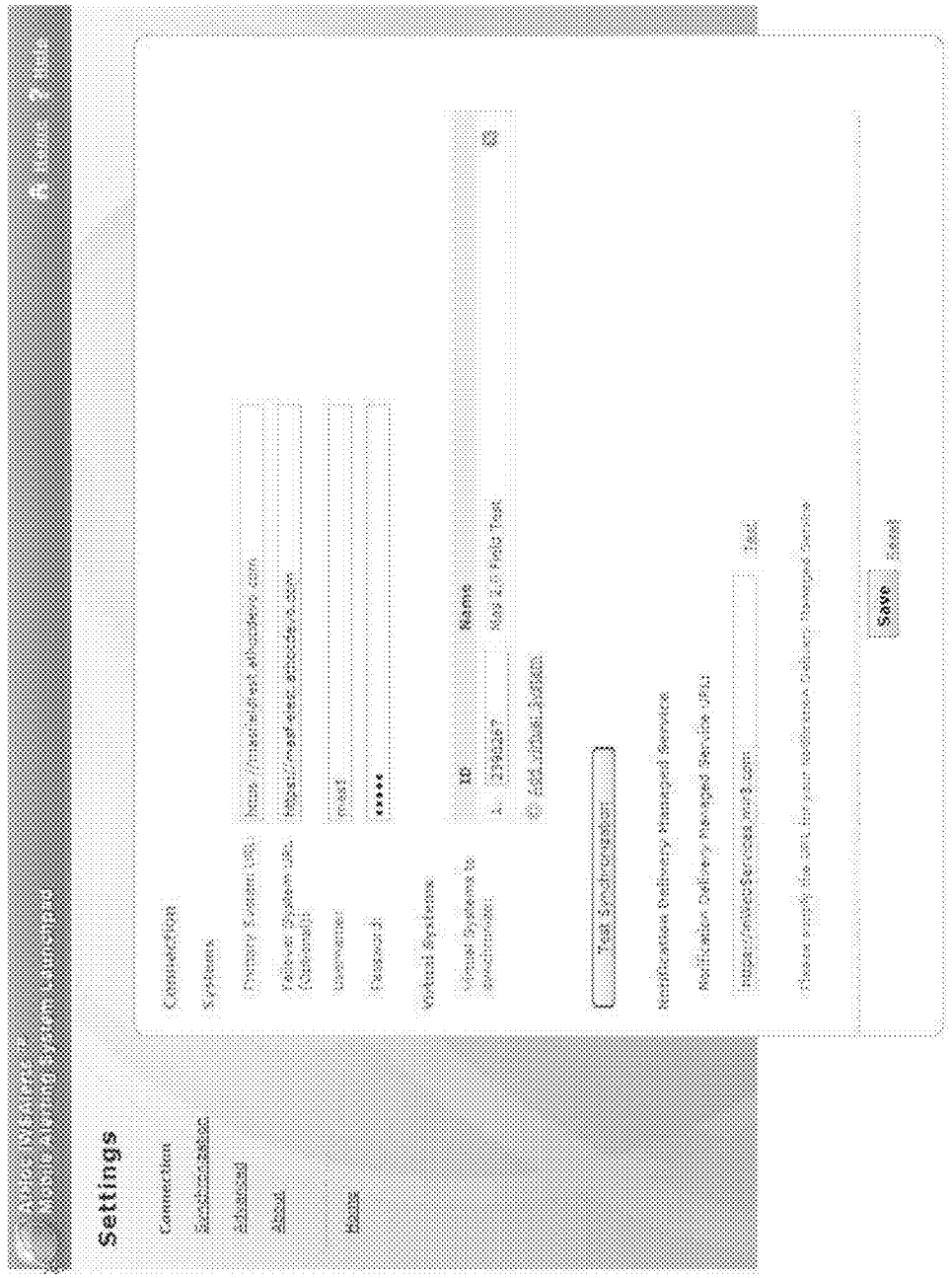
FIG. 10 is an example of a setup page for the MAS in a backup deployment configuration according to one embodiment.

The MAS 100 may include a dashboard (e.g., 170 in FIGS. 7 and 8), indicating the status of the MAS 100 as well as connectivity status of the mobile computing device and access to detailed status logs. If the MAS 100 is used as a backup for a central EMNS, the dashboard may also indicate availability of the organization's central alerting system, and freshness of the local system's data repository. FIG. 9 is an example of a MAS dashboard of a MAS 100 as a backup to a central on-premise EMNS (e.g., the backup deployment configuration). In backup deployment configuration, the dashboard 170 may also provide user interface to setup data synchronization parameters. FIG. 10 is an example of a setup page for backup deployment configuration of the MAS 100. The dashboard 170 may be implemented using a web based application. In an alternative embodiment of the invention, the MAS 100 may be implemented as a client application residing on the mobile computing device. The MAS 100 can be installed natively on the mobile computing device, or installed in a virtual machine on the native OS of the mobile computing device.

FIG. 9 is an example of a MAS dashboard for the example deployment of the MAS as a backup to a central on-premise emergency mass notification system according to one embodiment. The local MAS dashboard (e.g., element 170 in FIGS. 7 and 8) illustrated in FIG. 9 can be web based or client application and presents to a user with: (a) connectivity status of the laptop, (b) connectivity status to the central system, (c) access of the local MAS system 100 to the remote communication systems 200 and (d) availability of the local MAS system 100. The dashboard may show a recommendation what system to use: if the central system is accessible, it will be the recommended choice. FIG. 9 includes an example recommendation to use local MAS alerting instead of the central EMNS. In this example, the user is able to access any of the systems using a single action, for example, a mouse click, touchpad or touch screen tap, or a touchpad or touch-screen swipe. The dashboard also allows on-demand synchronization as well as update of synchronization parameters and view of details activity logs (synchronization, connectivity, etc.).

When used as a backup to a central EMNS system (e.g., during non-emergency periods), the MAS 100 is usually connected to the local network (or via WAN and VPN), and gets data updates from a central system, as described above. In an emergency situation, when Emergency Operation Center needs to be evacuated, or when central system and its backups are not operational or not available, the MAS 100 is connected to the Internet via an alternate route (for example, Wi-Fi, broadband or satellite), and can be used by its authenticated and authorized operators to securely send emergency notifications to targeted recipients using the remote communication systems 200.

MAS Data Update and Synchronization Process

Figure 7:
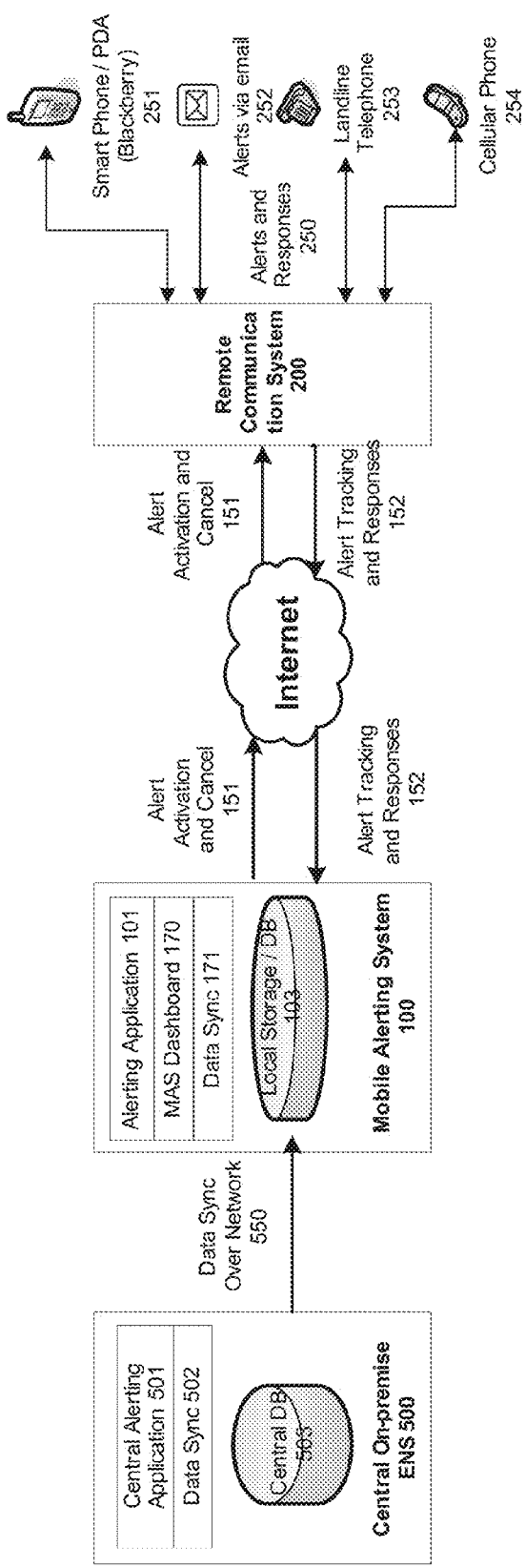
FIG. 7 illustrates an example deployment of the MAS as a backup to a central on-premise emergency mass notification system according to one embodiment.

When the MAS 100 is used as a backup for an on-premise central EMNS 500 (as illustrated in FIG. 7), the MAS 100 implements a data update module, i.e., data sync module 171, which is responsible for background data synchronization with the central emergency notification system. In one embodiment, the data sync module 171 is configured to download all or a subset of the operational data 550 and update its local repository in the local storage/database 103. The update can be automated to be run on a set schedule, and/or be activated on-demand.

The data update module can be implemented in multiple ways. Taking the data sync module 171 of FIG. 7 as an example, one example embodiment of the data update module include a data sync module 502 of a centralized system 500 for exporting data per subset of the system (e.g., a unit, a department), or all system. The export can be implemented using intermediate file format (for example, XML based) or a database backup. The exported files may be compressed and stored in a centralized repository (e.g., central DB 503 or a file system). The central system 500 maintains parameters to what needs to be exported, and on what schedule. Every exported file or groups of files are time stamped.

Another embodiment of the data update module includes a local MAS sync module (e.g., the data sync module 171). The data sync module 171 can be activated on a schedule, and/or on demand. Upon synchronization, the module 171 checks a computer server to see what data (export) is available. If there is a newer file (or group of files) on the central system, the data sync module 171 downloads the files, possibly using chunks (to ensure appropriate download of large files), and optionally throttles bandwidth use to minimally affect network performance. Once all needed data is downloaded, the data sync module 171 extracts the compressed files, loads the files into temporary tables (or database), and imports the data into the running database instance on the local storage/database 103. The data sync module 171 potentially runs some local update scripts (to update sequences, filter data, etc). If the update procedure is in process, the local MAS system may not be accessible for a user (to avoid data conflicts due to partial update). The data sync module 171 is further configured to adjust the data synchronization process based on network bandwidth.

Figure 11:
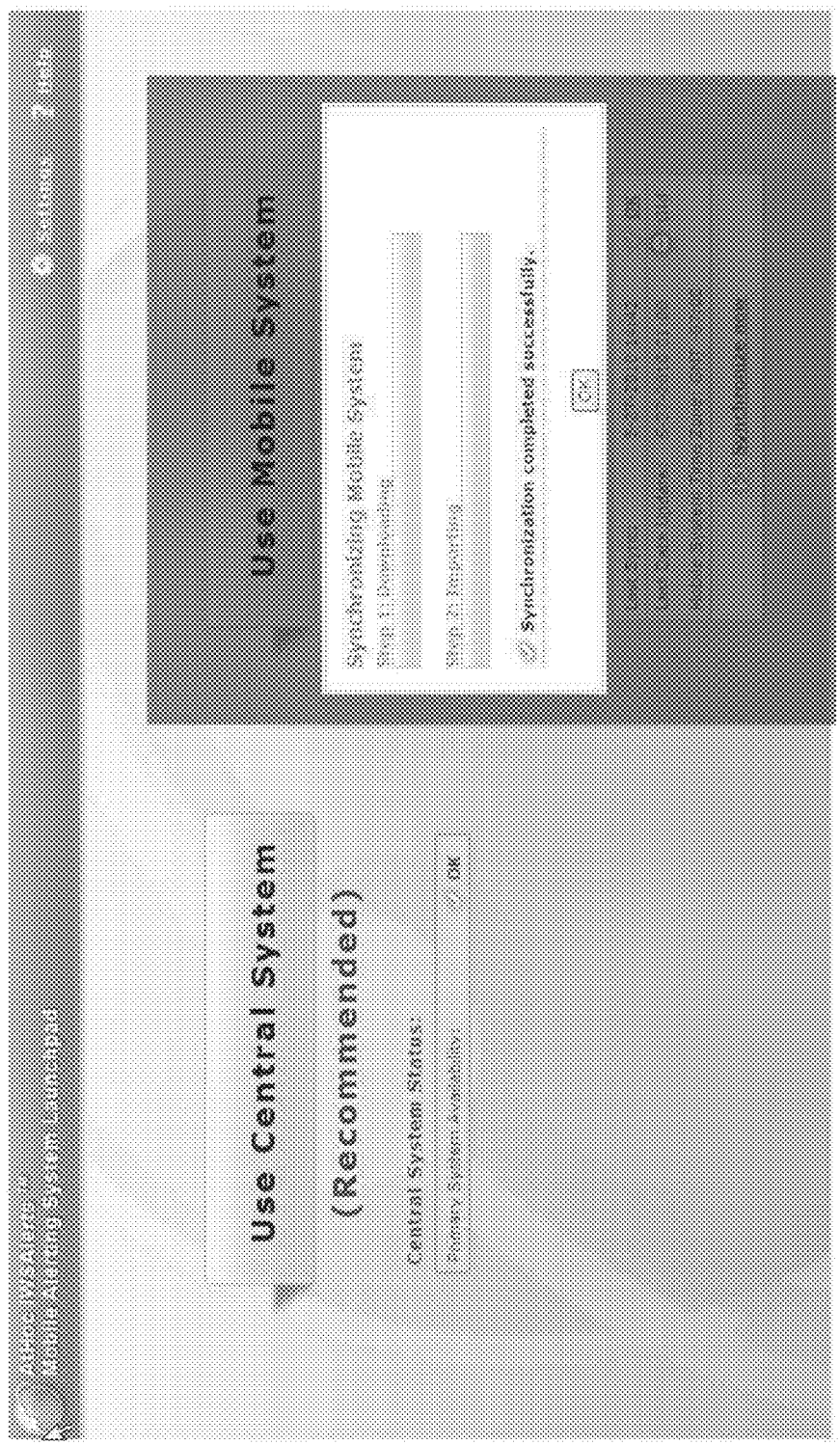
FIG. 11 illustrates one embodiment of alert data synchronization according to one embodiment.

An example of alert data synchronization process is shown in FIG. 11. Responsive to all update being complete, the local MAS system 100 may be available for use, as needed. The synchronization process may be aborted by an operator, if needed. An operator may also choose to revert back to the state prior to last synchronization. Another implementation keeps the running data instance, while updating a shadow copy, maintaining full MAS functionality during the update, and switching between the data sets upon completion of the data synchronization.

Additional Configuration Considerations

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as described with FIGS. 2, 4 and 6. Modules may constitute either software modules (e.g., code embodied on a machine-readable medium or in a transmission signal) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented, e.g., processor 102. For example, at least some of the operations of a method, e.g., as described in FIG. 12, may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors, e.g., 102, may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, e.g., 102, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting" "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for predicting potential reach of an alert to a targeted audience in an emergency mass notification system through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A mobile device for delivering one or more alerts, comprising:
 a non-transitory computer-readable storage medium storing executable computer program modules comprising:
  a module for receiving an alert initiation request;
  a module for extracting metadata of an alert to be transmitted responsive to the alert initiation request;
  a module for persistently storing the extracted metadata in a first storage place;
  a module for securely transmitting the alert initiation request and extracted metadata to one or more communication systems; and
 a processor for executing the computer program modules.

2. The mobile device of claim 1, wherein the extracted metadata include information for transmitting the alert to one or more communication systems.

3. The mobile device of claim 1, wherein the alerts are delivered by the communication systems via one or more communication devices including a telephone call from a Public Telephone Network, a Short Message Service, an electronic mail, a smart-phone push-notification service and an Instant Messaging Service.

4. The mobile device of claim 1, wherein the metadata associated with the alert initiation request is stored transiently within each of the communication systems for the duration of delivering the alert.

5. The mobile device of claim 4, wherein storing transiently the metadata of the alert initiation request further comprises:

selecting one or more sensitive data from the metadata based on a predetermined rule; and masking the selected sensitive data responsive to the end of the alert delivery.

6. The mobile device of claim 5, wherein masking the selected sensitive data comprises:

scrapping some or the entire sensitive data.

7. The mobile device of claim 1, further comprising:

a module for collecting tracking data and alert responses from the communication systems; and a module for updating the metadata stored persistently in the first storage place based on the collected tracking data and alert responses.

8. The mobile device of claim 1, further comprising a communication protocol between the computer system and one or more communication systems, the communication protocol comprising a plurality of types of requests including:

a request for initiating an alert transmission;

a request for cancelling an alert transmission;

a request for reporting delivery progress for an alert; and one or more other types of requests for alert delivery by the computer system.

9. The mobile device of claim 8, wherein the request for initiating an alert transmission from the communication systems comprises at least one of alert content to be delivered, alert parameters, recipients list, notification delivery device addresses, a list of devices to be targeted and alert delivery scheduling.

10. The mobile device of claim 8, wherein the request for reporting delivery progress for an alert comprises a request for tracking data and alert responses associated with the alert delivered within the communication systems.

11. The mobile device of claim 1, further comprising a module for importing user data one or more organizational user repositories including lightweight directory access protocol (LDAP) and Active Directory on a periodic, scheduled basis or on demand.

12. A method for delivering one or more alerts by a mobile device, the method comprising:

receiving an alert initiation request;

extracting metadata of an alert to be delivered responsive to the alert initiation request;

persistently storing the extracted metadata in a first storage place; and transmitting securely the alert initiation request and extracted metadata to one or more communication systems.

13. The method of claim 12, wherein the extracted metadata include information for transmitting the alert to one or more communication systems.

14. The method of claim 12, wherein the alerts are delivered by the communication systems via one or more communication devices including a telephone call from a Public Telephone Network, a Short Message Service, an electronic mail, a smart-phone push-notification service and an Instant Messaging Service.

15. The method of claim 12, wherein the metadata associated with the alert initiation request is stored transiently within each of the communication systems for the duration of delivering the alert.

16. The method of claim 15, further comprising:

selecting one or more sensitive data from the metadata based on a predetermined rule; and masking the selected sensitive data responsive to the end of the alert delivery.

17. The method of claim 16, wherein masking the selected sensitive data comprises:

scraping some or the entire sensitive data.

18. The method of claim 12, further comprising:

collecting tracking data and alert responses from the communication systems; and updating the metadata stored persistently in the first storage place based on the collected tracking data and alert responses.

19. The method of claim 12, further comprising a communication protocol between the computer system and one or more communication systems, the communication protocol comprising a plurality of types of requests including:

a request for initiating an alert transmission;

a request for cancelling an alert transmission;

a request for reporting delivery progress for an alert; and one or more other types of requests for alert delivery by the computer system.

20. The method of claim 19, wherein the request for initiating an alert transmission from the communication systems comprises at least one of alert content to be delivered, alert parameters, recipients list, notification delivery device addresses, list of devices to be targeted and alert delivery scheduling.

21. The method of claim 19, wherein the request for reporting delivery progress for an alert comprises a request for tracking data and alert responses associated with the alert delivered within the communication systems.

22. The method of claim 12, further comprising importing user data, one or more organizational user repositories including lightweight directory access protocol (LDAP) and Active Directory on a periodic scheduled basis or on demand.

* * * * *